Patented Jan. 6, 1942

2,268,832

UNITED STATES PATENT OFFICE 2,268,832

PROCESS FOR SOFTENING ARTIFICIAL CELLULOSIC MATERIALS

Walter König, Wiesbaden, Germany, assignor to Rudolph Koepp & Co. Chemische Fabrik A. G., Oestrich, Rhg, Germany No Drawing. Application July 16, 1938, Serial No. 219,646. In Germany July 23, 1937

10 Claims. (Cl. 91—68)

Shaped products, for example thin films of regenerated cellulose or cellulose derivatives, unless they contain special ingredients, are as a rule brittle and in this condition are unserviceable for most purposes. In order to render films as aforesaid suitable for practical use, they have been provided with so-called softening agents, which impart a supple or soft feel to them and increase their elasticity and folding value. Various organic substances, which for the greater part are also customarily used in the cellulose lacquer industry, are employed as softening agents. Esters, ethers, alcohols and urea derivatives are chiefly employed. Tricresyl phosphate, dibutyl phthalate, glycerine and diethyl-diphenyl urea (Mollit) are most commonly used. These softeners have however the disadvantage that they or their components are for the greater part synthetically difficult to prepare and therefore uneconomic in use. Moreover most of them have a disturbing smell or taste.

It has been further proposed for softening regenerated cellulose to employ hygroscopic inorganic salts, such as calcium chloride or magnesium chloride, if desired in admixture with known organic softeners. These salts have however a strongly corrosive action and have for this reason practically not been used.

According to this invention it has been found that shaped products of regenerated cellulose, cellulose esters, cellulose ethers or other cellulose derivatives can be successfully softened by incorporating potassium formate with the products.

Potassium formate is not only the cheapest organic potassium salt, but in addition thereto offers the advantage of being substantially less corrosive in action than the inorganic salts already proposed for softening regenerated cellulose. It is moreover entirely odourless.

Regenerated cellulose derived from viscose or cuprammonium solutions, cellulose esters, for example formyl, acetyl or benzyl cellulose, cellulose ethers, for example methyl cellulose, or other cellulose derivatives can be softened by the process of this invention. Particularly good results have been obtained with formyl cellulose.

Instead of potassium formate alone, potassium formate admixed with other water-soluble, deliquescent salts, which on evaporation of their dilute aqueous solutions at normal temperature and normal pressure do not crystallise or only crystallise with difficulty, may be employed. Mixtures of potassium formate with organic salts, for example potassium lactate, potassium acetate and potassium benzoate, or with inorganic salts, for example magnesium chloride, calcium chloride, zinc chloride, potassium fluoride, potassium nitrate or ammonium nitrate, may be employed.

It has been further found that mixtures of potassium formate with non-saline, but water-soluble, organic substances, such as glycerine and its derivatives, for example diacetin or diformin, the various sugars and sugar alcohols, for example sorbitol or mannitol, urea, betain or glycocol and ethylene or butylene glycol, may be used with advantage as softeners.

Mixtures of potassium formate with water-soluble, deliquescent salts, which on evaporation of their dilute aqueous solutions at normal temperature and normal pressure only crystallise with difficulty and with non-saline, water-soluble organic substances, may of course also be employed.

A particular advantage of the softeners according to this invention is that they can be incorporated in the form of aqueous solutions with the films. For this purpose use is preferably made of 1 to 20%, preferably 2 to 10%, solutions. An advantageous method of carrying the process of this invention into effect is to treat thin films of regenerated cellulose or cellulose derivatives with the aqueous solution of the softeners, after which the films need only be dried in known manner, in order to obtain them in the desired condition ready for use. Supple and plastic films, which are neither greasy nor sticky and maintain their full transparency, are obtained. Other methods of incorporating the softeners with the films may of course also be employed.

Examples

1. Thin films of regenerated cellulose are treated with a 5% aqueous solution of potassium formate. After drying in the usual manner clear products of extraordinarily supple or soft feel, which possess the tensile strength, elasticity and folding value necessary for practical use, are obtained.

2. Thin formyl cellulose films are drawn through a 2% aqueous potassium formate solution and then dried. The softened material is of excellent quality and suppleness. The folding value is about 2000, the elasticity is about 30% and the tensile strength about 8–10 kgms.

3. Regenerated cellulose is saturated with an aqueous solution containing 2% of magnesium chloride and 1% of potassium formate. Clear films having a supple feel and the requisite tensile strength, elasticity and folding value are obtained.

4. Regenerated cellulose films are treated with an aqueous solution containing 5% of potassium formate and 1% of ethyl glycol. Clear and supple films are obtained, which with regard to tensile strength, elasticity and folding value possess at least the same values as the viscose films obtainable in commerce.

What I claim is:

1. A process for softening shaped products of artificial cellulosic materials selected from the group consisting of regenerated cellulose, cellulose esters and cellulose ethers which consists in impregnating the shaped products with potassium formate.

2. A process for softening thin films of artificial cellulosic materials selected from the group consisting of regenerated cellulose, cellulose esters and cellulose ethers which consists in impregnating the thin films with potassium formate.

3. A process for softening shaped products of artificial cellulosic materials selected from the group consisting of regenerated cellulose, cellulose esters and cellulose ethers which consists in impregnating the shaped products with mixtures of potassium formate with water soluble deliquescent salts which, on evaporation of their dilute solutions at normal temperature and normal pressure, only crystallize out with difficulty.

4. A process for softening thin films of artificial cellulosic materials selected from the group consisting of regenerated cellulose, cellulose esters and cellulose ethers which consists in impregnating the thin films with mixtures of potassium formate with water soluble deliquescent salts which, on evaporation of their dilute solutions at normal temperature and normal pressure, only crystallize out with difficulty.

5. A process for softening shaped products of artificial cellulosic materials selected from the group consisting of regenerated cellulose, cellulose esters and cellulose ethers which consists in impregnating the shaped products with mixtures of potassium formate with water soluble organic substances selected from the group consisting of polyvalent aliphatic alcohols, their esters and aliphatic amines.

6. A process for softening thin films of artificial cellulosic materials selected from the group consisting of regenerated cellulose, cellulose esters and cellulose ethers which consists in impregnating the thin films with mixtures of potassium formate with water soluble organic substances selected from the group consisting of polyvalent aliphatic alcohols, their esters and aliphatic amines.

7. A process for softening shaped products of artificial cellulosic materials selected from the group consisting of regenerated cellulose, cellulose esters and cellulose ethers which consists in impregnating the shaped products with mixtures of potassium formate with water soluble deliquescent salts which, on evaporation of their dilute solutions at normal temperature and normal pressure, only crystallize out with difficulty and with water soluble organic substances selected from the group consisting of polyvalent aliphatic alcohols, their esters and aliphatic amines.

8. A process for softening thin films of artificial cellulosic materials selected from the group consisting of regenerated cellulose, cellulose esters and cellulose ethers which consists in impregnating the thin films with mixtures of potassium formate with water soluble deliquescent salts which, on evaporation of their dilute solutions at normal temperature and normal pressure, only crystallize out with difficulty and with water soluble organic substances selected from the group consisting of polyvalent aliphatic alcohols, their esters and aliphatic amines.

9. A process for softening shaped products of artificial cellulosic materials selected from the group consisting of regenerated cellulose, cellulose esters and cellulose ethers which consists in impregnating the shaped products with an aqueous solution containing 1% to 20% of potassium formate and drying the shaped products.

10. A process for softening thin films of artificial cellulosic materials selected from the group consisting of regenerated cellulose, cellulose esters and cellulose ethers which consists in impregnating the thin films with an aqueous solution containing 1% to 20% of potassium formate and drying the thin films.

WALTER KÖNIG.